United States Patent

Pitsch et al.

[15] 3,659,193
[45] Apr. 25, 1972

[54] APPARATUS INCLUDING INITIAL ELECTRODE CHARGE MAINTAINING MEANS FOR MEASURING THE CONCENTRATION OF AN ELECTROLYTE

[72] Inventors: Johan Ludwig Pitsch, Nanterre; Gerard Charbonnier, Bretigny sur Orge, both of France

[73] Assignees: Compagnie Generale D'Electricite; Compagnie Generale D'Automatisme, Paris, France

[22] Filed: Dec. 24, 1969

[21] Appl. No.: 888,032

Related U.S. Application Data

[63] Continuation-in-part of Ser. No. 558,510, June 17, 1966, abandoned.

[30] Foreign Application Priority Data

June 17, 1965 France..........................................21231

[52] U.S. Cl..............................................324/29, 204/195

[51] Int. Cl. ...........................................................G01n 27/42
[58] Field of Search ..............324/29, 29.5, 20, 94; 204/195, 204/1 T

[56] References Cited

UNITED STATES PATENTS

| | | | |
|---|---|---|---|
| 2,832,734 | 4/1958 | Eckfeldt | 204/195 |
| 3,262,051 | 7/1966 | Payne | 324/29 |
| 3,275,534 | 9/1966 | Cannon et al. | 324/29 X |
| 2,069,562 | 2/1937 | Schnorf | 204/195 |
| 2,912,367 | 11/1959 | Asendorf et al. | 204/195 X |
| 3,242,729 | 3/1966 | Keller | 204/195 X |

*Primary Examiner*—Gerard R. Strecker
*Attorney*—Edwin E. Greigg

[57] ABSTRACT

A device for measuring the concentration of an electrolyte utilizing measuring electrodes and a current generating means supplying the electrodes with a small current for maintaining them in their initial charge state and voltage measuring means connected to the electrodes for indicating the concentration of the electrolyte.

13 Claims, 13 Drawing Figures

APPARATUS INCLUDING INITIAL ELECTRODE CHARGE MAINTAINING MEANS FOR MEASURING THE CONCENTRATION OF AN ELECTROLYTE

This application is a continuation-in-part application of Ser. No. 558,510, filed June 17, 1966, now abandoned.

The invention relates to the measurement or determination of the concentration of an electrolyte.

The concentration of an electrolyte is sometimes measured by means of two charged electrodes immersed in the electrolyte. In certain measuring conditions, the voltage between the two electrodes is a function of concentration and if this voltage is measured the concentration of the electrolyte may be determined.

Nevertheless, devices produced to date involve certain drawbacks. Specifically, lack of stability of the initial state of charge of the electrodes as a function of time causes imprecise measurement and makes it necessary to recharge the electrodes from time to time.

Moreover, during these recharges, the electrodes acquire a voltage by polarization which is no longer representative of the concentration of the electrolyte. The polarization phenomenon fades away slowly and during that time the electrodes are unusable.

The time constant of the variation of the voltage as a function of the variation of the concentration of the electrolyte for electrodes previously used makes it difficult to measure accurately rapid variations of concentration.

This invention serves to overcome the above-mentioned drawbacks by providing a device for measuring the concentration of an electrolyte in an electro-chemical generator, comprising two measuring electrodes immersed in the electrolyte, a voltage measuring apparatus connected with the terminals of said electrodes, and a means for supplying a quantity of electricity to each of the electrodes to enable them to retain their initial charge state. The polarization P is made negligible by utilizing a weak current and continually supply the same as either direct or stepped to the electrode terminals.

Accordingly, it is an object of the invention to provide a device for measuring the concentration of an electrolyte having measuring electrodes maintained at an optimum charge state, and wherein the measurement is obtained with higher precision and reliability.

It is another object of this invention to provide a device for measuring the concentration of an electrolyte which, when the charge circuits of each of the electrodes are separate, it is possible to automatically compensate separately possible variations in the measuring conditions.

It is yet another object of this invention to provide a device for measuring the concentration of an electrolyte in which the use of electrodes with low response time enables the rapid concentration variations to be detected and measured.

It is still another object of this invention to provide a device for measuring the concentration of an electrolyte which does not cause any deterioration or any influence upon other circuits or elements connected to any electrode immersed in the same electrolyte.

According to one embodiment of the invention, the device for measuring the concentration of an electrolyte comprises two measuring electrodes immersed in the said electrolyte, electric charge generating means or current source operatively connected to the said measuring electrodes and capable of supplying each of the electrodes during a predetermined period with a quantity of electricity maintaining them in their initial charge state, and a voltage measuring means connected to said measuring electrodes, the indication of said voltage measuring means being representative of the concentration of the said electrolyte during the said predetermined period.

According to another embodiment, the device comprises charge generating means including a current generator the terminals of which are connected respectively to the said measuring electrodes, said electrodes having active surfaces the ratio of the areas of which is equal to the inverse of the ratio of quantity of current per surface unit necessary respectively to each of the electrodes in order to maintain them at their initial charge state.

In order that the invention may be more clearly understood several embodiments of the invention will now be described, by way of example, with reference to the accompanying drawings, in which.

Figure 3:
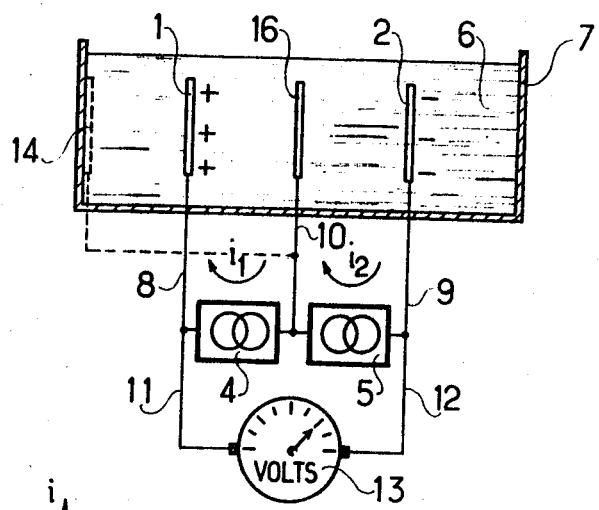
FIG. 3 shows another embodiment of the invention incorporating two current generators operative to supply current to the two electrodes respectively.
Figure 4:
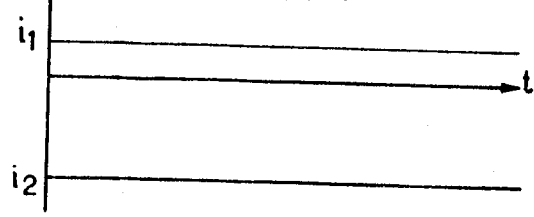

FIG. 4 graphically illustrates the currents supplied by the current generators of the embodiment shown in FIG. 3 plotted against time; and FIGS. 5 through 13 graphically illustrate other forms of current variation with respect to time for the currents of the two current generators of FIG. 3, the corresponding variations in polarization of the electrolyte and the optimum measuring times.

Figure 1:
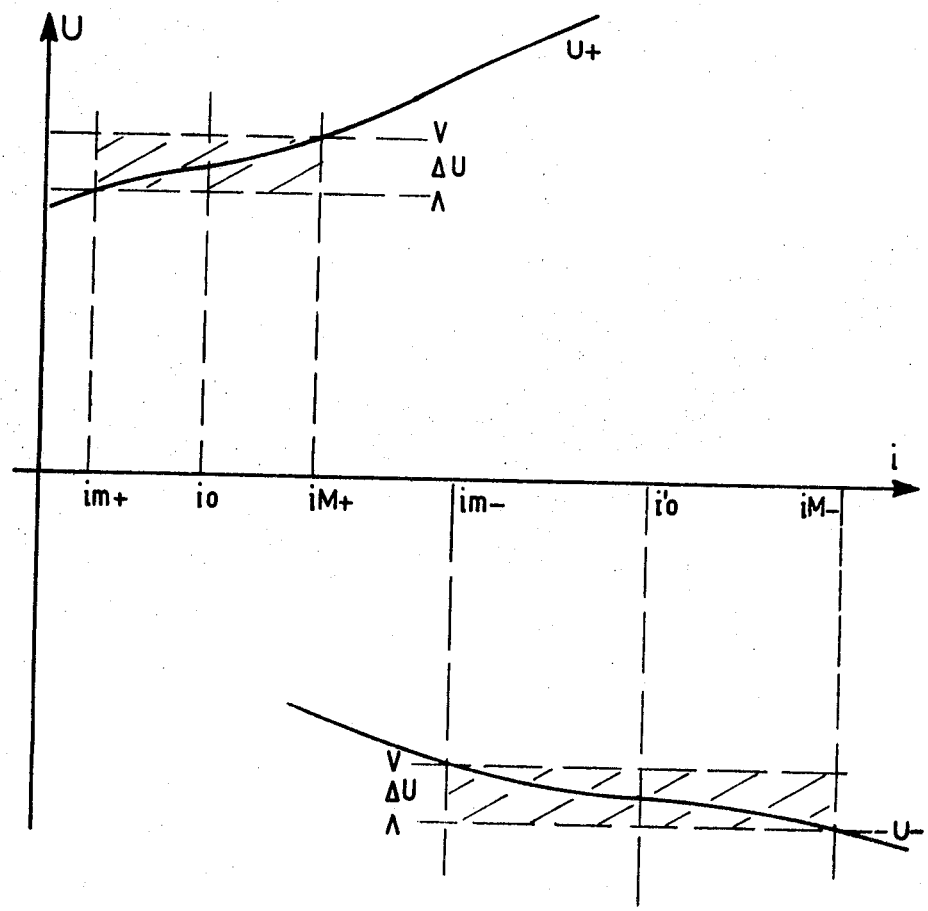
FIG. 1 is a diagram showing the variation of potential of each of the electrodes as a function of the current.

Referring to FIG. 1 two curves are shown which represent the variation of the potential U of the positive and the negative electrodes respectively measured with respect to a reference electrode, for example a hydrogen electrode, for a given concentration of the electrolyte as a function of the density of charging current $i$. The reference electrodes serves only to fix the origin of the potential scale since what is important is the relative variations of the potentials of the positive and negative electrodes and not the individual value of these potentials. Each curve has a substantially horizontal portion corresponding to the value of the density of the current which exactly balances the loss of charge of the corresponding electrode, the medium abscissae of these horizontal portions being indicated by $i_o$ for the positive electrode and by $i'_o$ for the negative electrode.

If an error margin of $\Delta_u$ in the potential U of each electrode is allowed $_o$ and $i'_o$ then comes within the range defined by $i_{m+}$ and $i_{M+}$ for the positive electrode and $i_{m-}$ and $i_{M-}$ for the negative electrode. It is noted that, even if a relatively high error-margin is allowed, such as is shown, for example, in FIG. 1, the two ranges do not overlap. This shows the necessity for choosing current densities of different values for the two electrodes, so as to maintain a suitable charge state while avoiding undesirable polarization.

Figure 2:
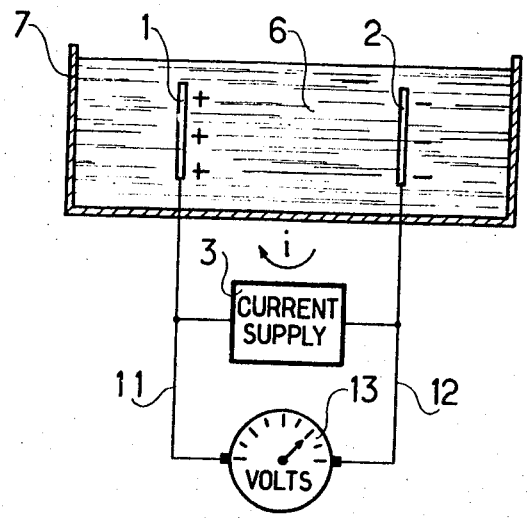
FIG. 2 shows one embodiment of the invention incorporating a current generator operative to supply current to the electrodes.

Referring to FIG. 2 a circuit of simple construction is shown which enables the obtention of a current density for one electrode different from the current for the other electrode.

The electrolyte 6 is contained by a vessel 7. Two electrodes, a positive electrode 1 and a negative electrode 2, are immersed in the electrolyte 6. The two electrodes are connected to current generator 3. A voltage measuring apparatus 13 is connected to the electrodes 1 and 2 by means of conductors 11 and 12. Since the voltage across the electrodes is a function of the concentration of the electrolyte between them, the concentration of the electrolyte may thus be determined. In accordance with the present invention, in order to obtain suitable charge densities, the ratio of the area of the active surfaces of the two electrodes 1 and 2 is inversely proportional to the ratio of the currents which are supplied to them to keep them at their initial state of charge.

Sometimes it is necessary, however, to have a surface ratio of about 1/10, which necessitates the use of a prohibitively large electrode. Indeed, the dimensions and the positioning of the electrodes must be chosen so that the latter are immersed in a part of the electrolyte in which there is no appreciable concentration gradient, and so that the composition of the electrolyte where they are placed is representative of the average concentration. With the above circuit, however, it is impossible to vary the charge density of the electrodes independently of each other by varying the current fed thereto since they are both energized by the same current source.

FIG. 2 shows one arrangement for overcoming the aforenoted problem. Two electrodes using the same current employ the selection of two electrodes whose lateral surfaces are in a 1:8 ratio, for example:

5 cm² for the negative electrode
40 cm² for the positive electrode.

The intensity of the current to be supplied to the electrodes is dependent upon the size of the exchange surface between the electrodes and the electrolyte. In order to maintain the electric charge state, namely, the initial state, it is necessary to provide a constant intensity per exchange surface unit, in other words, current density. This current density is not the same for both electrodes. As in the case described in FIG. 2, however, the same current can be made to circulate through two electrodes having different surface ratios which are equal to the inverse of those of the current densities. On the other hand, two currents having different values can be made to circulate through two electrodes by means of an auxiliary electrode, such as shown in FIG. 3. In this embodiment, the two measuring electrodes need no longer maintain the surface ratios as required with the apparatus shown in FIG. 2.

FIG. 3 shows another embodiment of the invention. As with the circuit shown in FIG. 2, the positive electrode 1 and a negative electrode 2 are immersed in an electrolyte 6 in a vessel 7. In addition, however, an auxiliary electrode 16 is immersed in the electrolyte 6 and two current generators 4 and 5 are provided. The current generators 4 and 5 are connected respectively between the positive electrode 1 and the auxiliary electrode 16, and the negative electrode and the auxiliary electrode 16.

The generator 4 delivers a current $i_1$ to the electrode 1 through a conductor 8. This current then passes through the electrolyte 6, the auxiliary electrode 16 and the conductor 10. The generator 5 delivers a current $i_2$ to the negative electrode 2 through the conductor 10. This current then passes through the electrode 16, the electrolyte 6 and the conductor 9. The currents $i_1$ and $i_2$ are adjusted to supply the necessary charges to each electrode, and this enables the use of electrodes of any shape, and more particularly the use of electrodes having the same dimensions.

A voltage measuring apparatus 13 is connected to the two electrodes 1 and 2 through the conductors 11 and 12. The concentration of the electrolyte from the reading of the voltage measuring apparatus may thus be determined as described above.

One form of the current variation with respect to time for the currents of the two current generators shown in FIG. 3 is shown in FIG. 4. In FIG. 4 the current values $i_1$ and $i_2$ are constant with respect to time and are of differing magnitude. The current magnitudes are those necessary to maintain the corresponding electrodes at the initial state of charge.

Three other forms of current variation are respectively shown in FIGS. through 7, 8 through 9 and 10 through 13.

Figure 5:
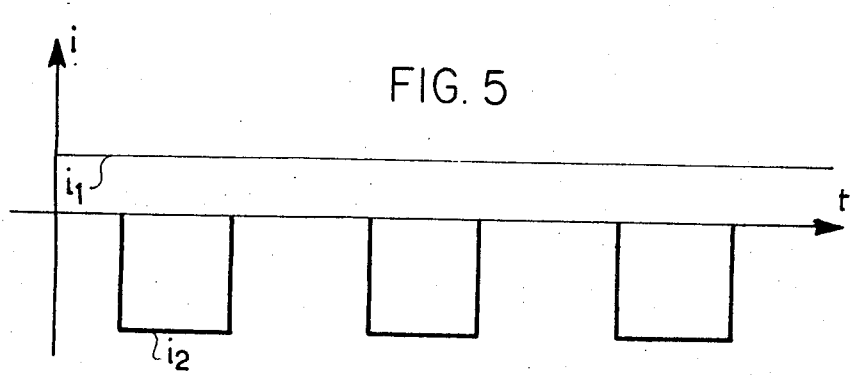
Figure 6:
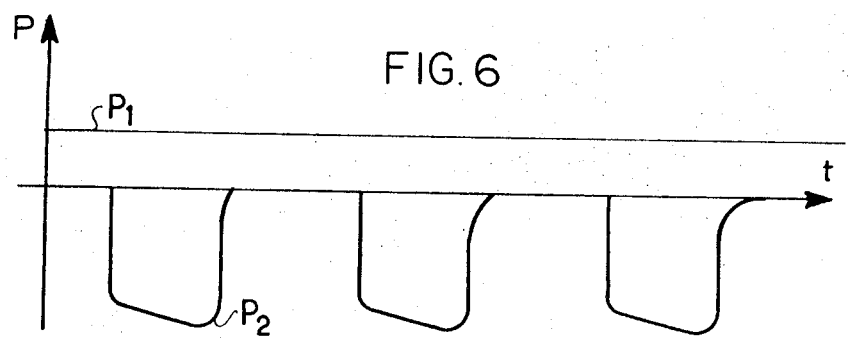
Figure 7:
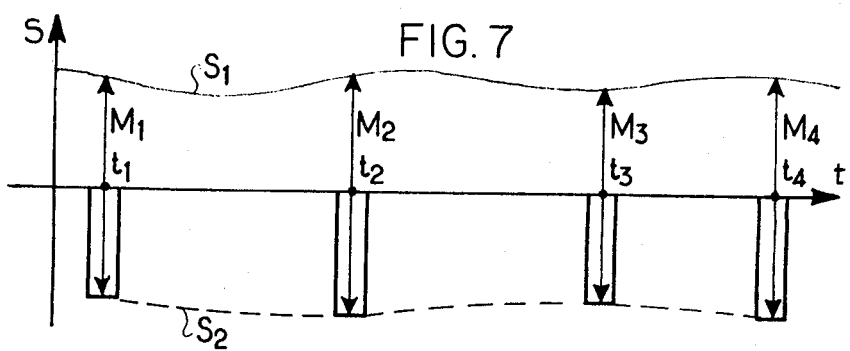

Referring to FIG. 5, FIG. 6 and FIG. 7 one of the generators supplies a constant direct current whereas the other generator supplies a pulsating current. FIG. 5 shows the current $i$ as a function of time $t$. It is noted that the current $i_1$ of the positive electrode is constant and that the current $i_2$ of the negative electrode is of substantially square-wave form.

The peak value of the current $i_2$ is higher than the constant value of the corresponding current $i_2$ of FIG. 4. Its average value may even be higher than the latter value.

FIG. 6 illustrates the variations of the polarization P of the two electrodes as a function of time $t$. The value of the polarization P is measured by the difference between the instantaneous voltage of an electrode and the balance voltage obtained in the absence of current. It is noted that the polarization of the positive electrode $P_1$ is constant and that the polarization of the negative electrode $P_2$ is of substantially square-wave form. The shape and the amplitude of these square-wave variations cannot be defined with precision, but it should be readily apparent that the moment when the polarization $P_2$ is stable and substantially constant corresponds to the rest periods of the current $i_2$.

FIG. 7 represents the voltage signal S measured between the electrodes 1 and 2 of FIG. 3. The voltage $S_1$, of the positive electrode, is read continuously whereas the voltages $S_2$, of the negative electrode, can only be validly read at moments $t_1$, $t_2$ corresponding to the rest periods of the current $i_2$, and preferably at the end of these rest periods, at which time the risk of the potential of the negative electrode being effected by polarization will be at a minimum. Measurements $M_1$, $M_2$ correspond the the times $t_1$, $t_2$.

FIGS. 8 through 10 and 11 through 13 show curves similar to those of FIG. 5 through 7 and correspond to the circuit of FIG. 3 when both current generators 4 and 5 are capable of supplying pulsating currents.

Figure 8:
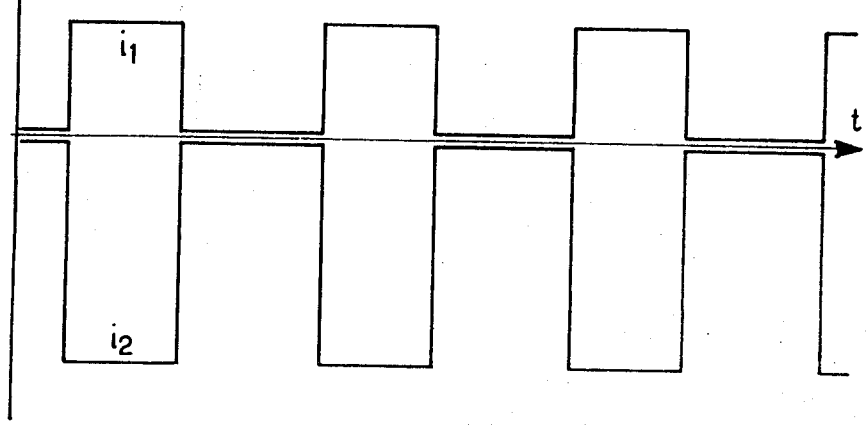
Figure 9:
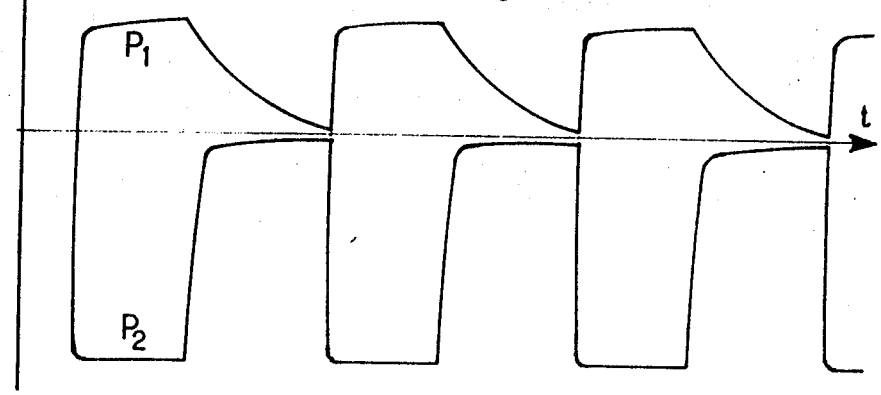
Figure 10:
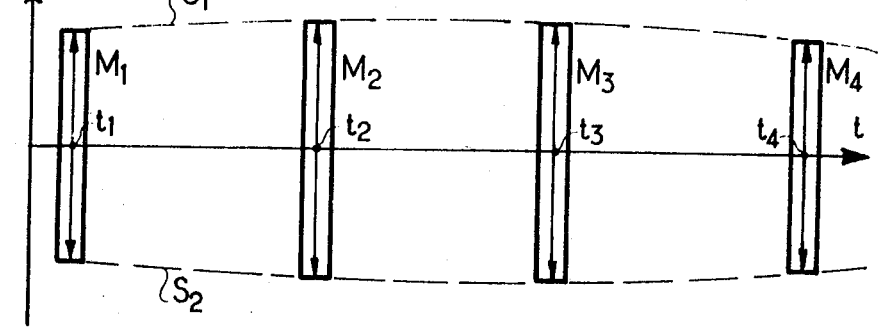

Referring to FIG. 8 through 10, the currents supplied by the generators 4 and 5 are in phase and have the same pulse width. The rest periods are sufficiently long to enable the polarization to fade away, as shown by FIG. 10, the measurements being taken during these rest periods and preferably at the end, as shown by FIG. 10.

Figure 11:
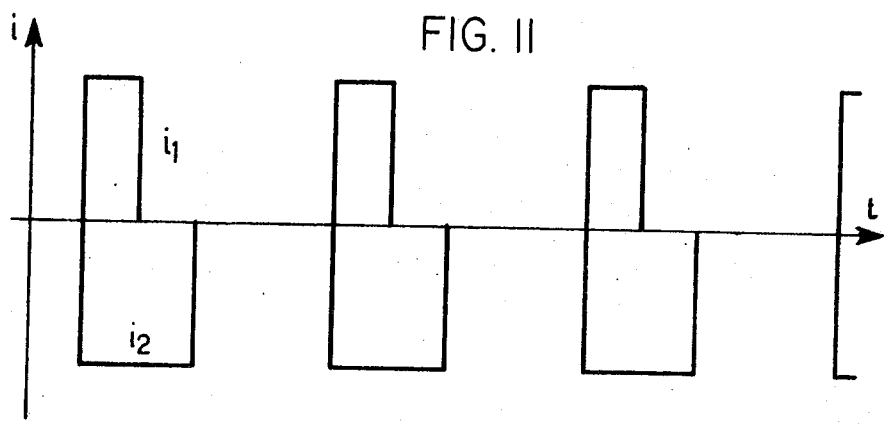
Figure 12:
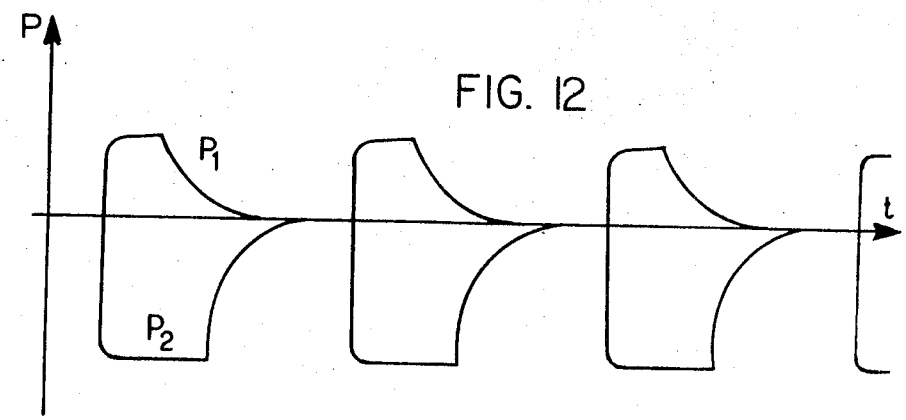
Figure 13:
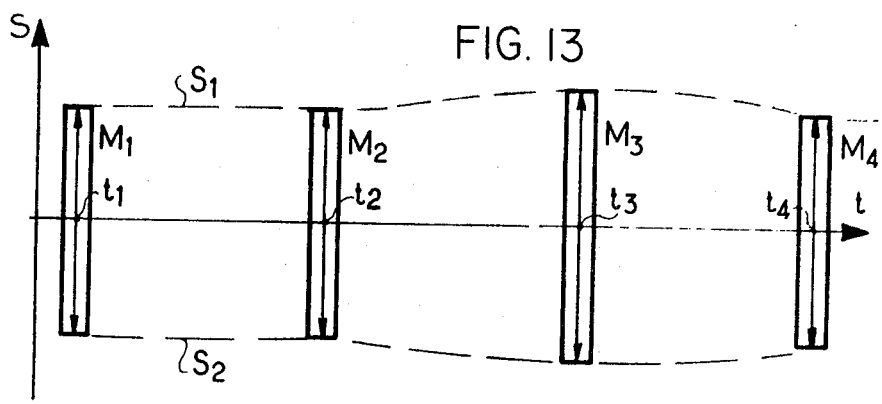

Referring to FIG. 11 through 13, the currents applied by the generators 4 and 5 are still in phase but the pulse widths are different. The rest periods are still large enough to allow the polarization to fade away, and the measurements are preferably taken at the end of the rest periods.

The nature of the electrodes 1 and 2 must be compatible with the composition of the electrolyte 6 and with other electrodes which may be immersed in this same electrolyte 6. The structure of the active part of the electrodes 1 and 2 must be such that the diffusion of the electrolyte takes place within a minimum time. The size and positioning of the electrodes 1 and 2 must be chosen so that they are immersed in a part of the electrolyte which does not have an appreciable concentration gradient, and that the composition of the electrolyte in that place is representative of the average concentration.

For example, in the case of an element of a lead battery, these electrodes may be of the "Plante" type and are preferably located at a certain distance from the upper and lower surfaces of the vessel containing the electrolyte.

The auxiliary electrode 16 may be placed in any part of the electrolyte whatever and may be neutral or capable of electrochemical exchanges. The auxiliary electrode 16 may also be formed of one of the electrode of the electrochemical generator itself, or even of a conductive coating of the vessel containing the electrolyte as illustrated schematically at 14 in FIG. 3.

Since the currents maintaining the measuring electrodes on charge are permanently applied the electrodes do not require a large capacity. It is therefore advantageous to employ electrodes of small active area which enables the obtention of very low time constants, the exchange between the active electrolyte and the ambient electrolyte being then very rapid. In order to obtain precise measurement, the conductors 8, 9 and 10 should not present troublesome contact or junction potential drops. With the device described above the concentration of the electrolyte may be obtained with precision and reliability.

When the current supply circuits of each of the electrodes 1 and 2 are separate, as in FIG. 3, it is impossible to compensate for possible variations in the measuring conditions, and more particularly the temperatures conditions for each of the electrodes 1 and 2 independently. This correction may be carried out automatically by appropriate conventional circuits regulating the current of each generator. The use of electrodes with a low response time enables rapid variations of concentration to be detected and measured. The devices described do not cause any deterioration or any influence upon other circuits or elements connected to any electrode immersed in the same electrolyte.

A specific embodiment used to measure the electrolyte of submarine cells uses two lead measuring electrodes having lateral surfaces equal to $S = 7$ cm² and any auxiliary electrode (for example, of lead) whose surface is equal to $S' = 3$ cm².

In this case, currents are:
  for the negative electrode : $41\mu A$
  for the positive electrode : $6\mu A$
For a concentration ranging from 3 percent to 38 percent, the electrode voltage varies linearly from 1.86 V to 2.15 V.

The above description has been given merely by way of a non-limiting example, and it is understood that modifications and variations may be introduced without departing from the scope of the invention.

That which is claimed is:

1. A device for measuring the concentration of an electrolyte comprising: two measuring electrodes charged to an initial condition submerged into the electrolyte, a current source means for supplying permanently to each electrode during the entire duration of the measuring process a quantity of electricity adapted to compensate for any loss of charge and to thus maintain the electrode in its initial charged condition, and voltage measuring means for measuring the potential difference between the electrodes, said potential difference being indicative of the concentration of the electrolyte.

2. A device according to claim 1, in which said current source comprises a current generator the terminals of which are connected respectively to the said two measuring electrodes, said electrodes having active surfaces the ratio of the areas of which is equal to the inverse of the ratio of the quantities of current per surface unit necessary respectively to each of the electrodes in order to maintain them at their initial state of charge.

3. A device according to claim 1 in which said current source comprises first and second current generators and an auxiliary electrode, said auxiliary electrode being adapted to be immersed in said electrolyte and being connected to one terminal of said first current generator, the other terminal of which is connected to one of the said measuring electrodes, and said auxiliary electrode being further connected to one of the terminals of said second current generator, the other terminal of which is connected to the other measuring electrode, said current generators being capable of delivering currents maintaining respectively the initial states of charge of said measuring electrodes.

4. A device according to claim 3 in which said current generators are constant amplitude direct current generators.

5. A device according to claim 3, in which said first current generator is a constant amplitude direct current generator and said second generator is a pulse generator, the voltage measuring means connected between two measuring electrodes being operable to carry out measurement when the current of said generator is equal to zero.

6. A device according to claim 5, in which said voltage measuring means is operable to carry out measurements substantially at the end of a rest period of said second current generator.

7. A device according to claim 3, in which said current generators are operable to deliver substantially square-wave pulses, the pulses of said second generator being synchronized and in phase with the pulses of said first generator, said voltage measuring means being connected between said measuring electrodes and being operable to carry out measurement during the periods when the currents of said generators are simultaneously equal to zero.

8. A device according to claim 6, in which the pulses produced by said first generator are of different duration from the pulses produced by said second generator.

9. A device according to claim 3 in which the electrolyte, the concentration of which is to be determined, is held in a vessel forming a part of an electrochemical generator, the auxiliary electrode being formed by one of the electrodes of said electrochemical generator.

10. A device according to claim 3, in which the electrolyte, the concentration of which is to be determined, is held in a vessel and the auxiliary electrode is formed by an electrically conducting coating deposited on at least a part of the inner surface of said vessel.

11. A device according to claim 10, in which said vessel is the casing of an electrochemical generator.

12. A device according to claim 3 wherein the electrolyte is held in a vessel forming a part of an electro-chemical generator, the auxiliary electrode being formed by one of the electrodes of said electrochemical generator.

13. A device according to claim 3, wherein said first and said second current generators are operable to deliver substantially square-wave pulsating currents, the pulses of the current of said second generator being synchronized and in phase with but having a different duration from the pulses of said first generator, said voltage measuring means connected between said measuring electrodes being operable to carry out measurement during the periods when the currents of said first and second generators are simultaneously equal to zero.

* * * * *